C. JASS.
PULVERIZING ROLLER.
APPLICATION FILED MAR. 13, 1911.

996,038.

Patented June 20, 1911.

WITNESSES

INVENTOR
Carl Jass

UNITED STATES PATENT OFFICE.

CARL JASS, OF HORICON, WISCONSIN.

PULVERIZING-ROLLER.

996,038.  Specification of Letters Patent.  Patented June 20, 1911.

Original application filed May 27, 1909, Serial No. 498,596. Divided and this application filed March 13, 1911. Serial No. 614,062.

*To all whom it may concern:*

Be it known that I, CARL JASS, a citizen of the United States, residing at Horicon, in the county of Dodge and State of Wisconsin, have invented certain new and useful Improvements in Pulverizing-Rollers, of which the following is a specification, reference being had therein to the accompanying drawing.

This invention relates to pulverizing rollers especially adapted for use in connection with agricultural machines, and the principal object of the same is to provide novel teeth for the rollers which are normally held in position to penetrate the soil, but which are supported so that they will yield if an obstruction is contacted with.

One practical and preferred embodiment of my invention is shown in the accompanying drawings, wherein:—

Figure 1:
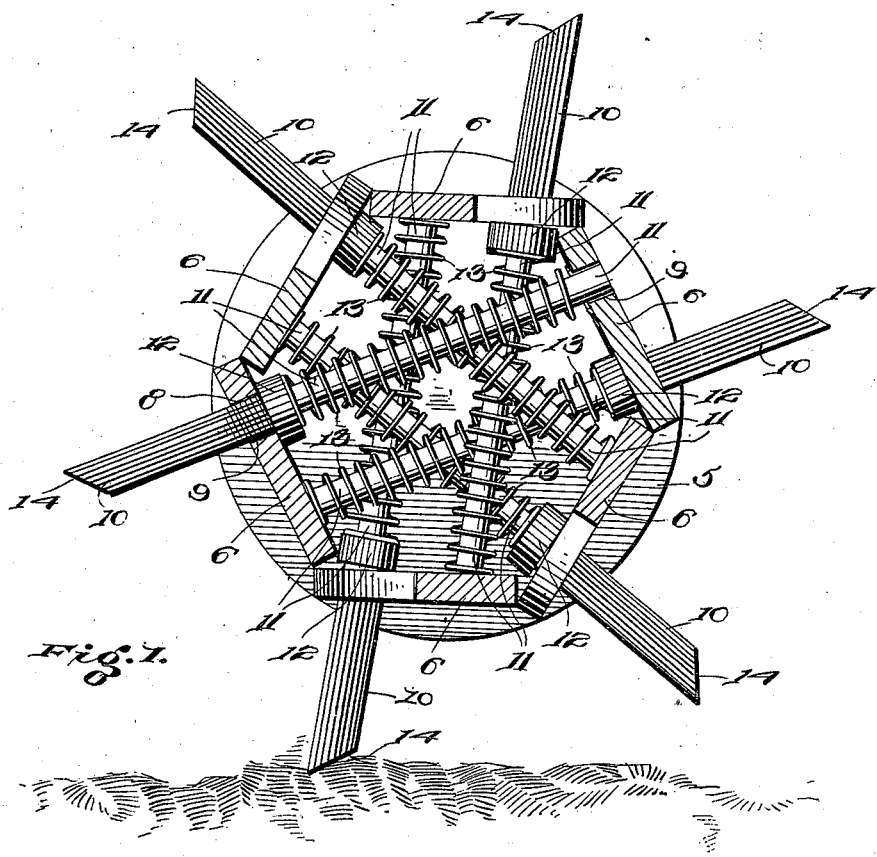
Figure 2:
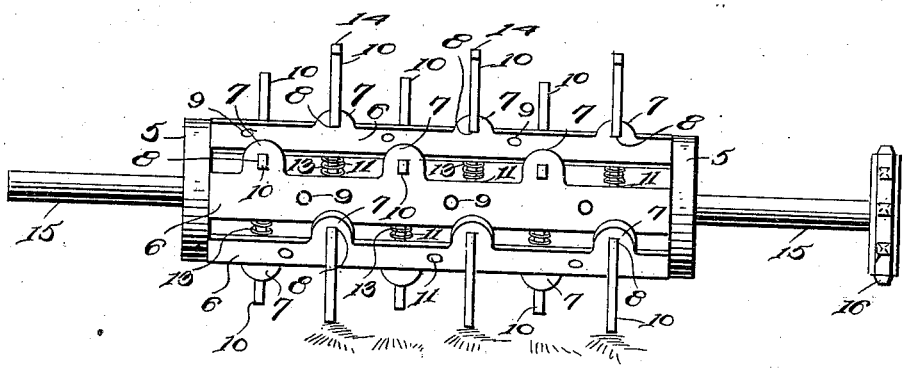

Figure 1 is a vertical transverse sectional view of the improved roller. Fig. 2 is a view in side elevation.

Referring to the accompanying drawings by numerals it will be seen that the improved roller comprises a pair of end disks 5 which are retained in spaced relation by the connecting bars 6 which are preferably flat and arranged to provide a skeleton body having a plurality of flat surfaces. Each bar 6 has one longitudinal edge provided with regularly spaced laterally projecting ears 7, and said ears are arranged so that they overlap the straight longitudinal edge of the adjacent bar. The ears 7 of the bars are also arranged so that the ears of adjacent bars are in staggered relation, and said ears are provided with transverse openings 8 that are preferably rectangular in shape. The bars 6 are provided with transverse openings 9 which are preferably circular and said openings are staggered relative to the openings of the ears 7. The bars 6 are arranged so that the openings of the ears 7 of one bar are in alinement with the openings of the diagonally opposite bar, and penetrating teeth slidably engage said alined openings. Said teeth comprise the rectangularly shaped penetrating portions 10, which are slidable through the openings of the ears 7 and the rounded shanks 11 which are slidable through the openings of the bars 6. At the junction of the shanks and penetrating portions, the teeth carry abutment flanges 12 which limit the outward movements of the teeth by contacting with the ears 7. Springs 13 are coiled about the shanks 11, said springs bearing upon the flanges 12 and the bars through which the shanks are slidable and normally retain the teeth projected outward relative to the roller. Preferably the outer ends of the penetrating portions are beveled, as indicated at 14 to facilitate the entrance of said portions in the soil.

The improved roller is of special value in connection with seeders and drills such as is disclosed in my co-pending application, Serial No. 498,596, filed May 27, 1909, of which this application is a division. In said prior application means are provided for vertically adjusting the pulverizing rollers, said means including guides which the end shafts 15 that project from the disks 5 slidably engage. One of said shafts 15 is provided with a sprocket 16 by means of which the roller may be rotated from the seeder.

It will be understood from the foregoing that the teeth being yieldably mounted they will retract against the tension of the springs 13 when an obstruction is encountered so that said obstruction will not damage the teeth.

What I claim as my invention is:—

1. A pulverizing roller comprising end disks, bars connecting said disks in spaced relation, one longitudinal edge of each bar being provided with ears, said bars and ears being provided with transverse openings, penetrating teeth slidably engaging the openings of diametriclaly opposite ears and bars, flanges carried by said teeth for limiting their outward movement, and springs for yieldably retaining said teeth in outwardly projected positions.

2. A pulverizing roller comprising a pair of disks, flat bars for connecting said disks in spaced relation, said bars having one longitudinal edge provided with ears that overlap one longitudinal edge of adjacent bars, teeth slidably engaging said ears and bars, and springs coiled about said teeth for yieldably retaining the same in outwardly projected positions.

3. A pulverizing roller comprising end disks, bars for connecting the same in spaced relation, said bars having ears at one longitudinal edge, the ears of adjacent bars being arranged in staggered relation, said ears and bars being provided with openings, and the openings of the ears and bars being arranged in staggered relation, teeth having shanks for slidably engaging the openings of the bars and penetrating portions for slidably engaging the openings of the ears, flanges carried by said teeth for limiting the outward movements of the teeth, and springs carried by the shanks of the teeth for yieldably retaining the teeth in outwardly projected positions.

In testimony whereof, I hereunto affix my signature in presence of two witnesses.

CARL JASS.

Witnesses:
 EDWARD C. DAWE,
 AHYMAN P. BOUTON.

---

Copies of this patent may be obtained for five cents each, by addressing the "Commissioner of Patents, Washington, D. C."